(No Model.)
F. G. CORNING.
MEANS FOR STORING AND SUPPLYING ELECTRICAL ENERGY BY NATURAL FORCE.
No. 499,780. Patented June 20, 1893.
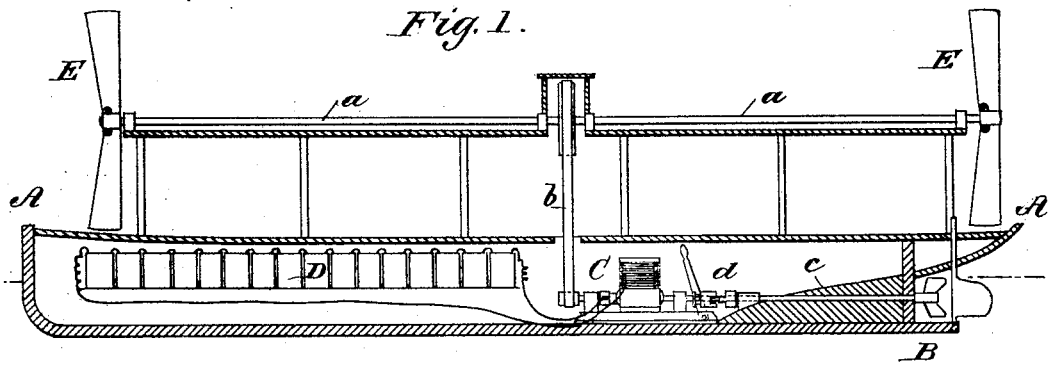
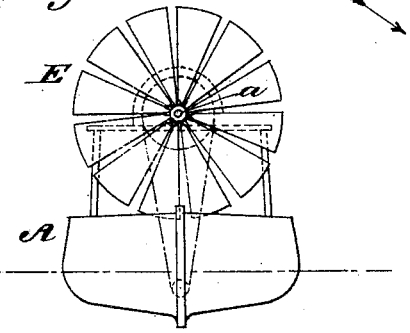
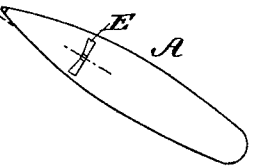
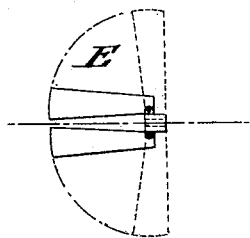
WITNESSES:
E. Mac Entee
Wm C. Behrens
INVENTOR
Frederick G. Corning
BY
Henry F. Parker
ATTORNEY

UNITED STATES PATENT OFFICE.

FREDERICK G. CORNING, OF NEW YORK, N. Y.

MEANS FOR STORING AND SUPPLYING ELECTRICAL ENERGY BY NATURAL FORCE.

SPECIFICATION forming part of Letters Patent No. 499,780, dated June 20, 1893.

Application filed November 14, 1892. Serial No. 451,881. (No model.)

*To all whom it may concern:*

Be it known that I, FREDERICK G. CORNING, a citizen of the United States, residing at the city, county, and State of New York, have invented certain new and useful Improvements in Means of Storing and Supplying Electrical Energy by Natural Force, of which the following is a specification.

This invention relates to means for gradually storing power by natural forces to be subsequently utilized with comparatively rapid expenditure.

The object of the invention is to dispense with the combustion of fuel in the mechanical propulsion of vessels.

The invention consists in a certain novel combination of instrumentalities or their equivalent hereinafter set forth, whereby the natural force exerted by the wind may be applied to a boat at anchorage or at other times, to effect the gradual accumulation of electrical energy to be subsequently used as a motive power for propulsion.

Referring to the accompanying drawings: Figure 1, represents a boat in sectional elevation, provided with suitable devices for carrying the invention into practice; Fig. 2, an end elevation of Fig. 1; Fig. 3, a diagram showing the position of the boat at its moorings with reference to the wind; and Fig. 4, shows one of the detachable wind motor wheels E, in detail, folded.

A, represents a boat having any suitable construction, or size, or desired purpose.

B, is a screw propeller; any other suitable or usual character of mechanical propelling device being also appropriate to the invention.

C, is an electrical dynamo-machine convertible into a motor, and D, represents series of electrical storage batteries or accumulators, electrically connected to the machine C, in any well known or suitable manner such as to permit the said accumulators D, to be charged by the machine C, when the latter is rotated by an original power, and in turn to cause the machine C, to be driven by the current discharged by the accumulators D, after the electical energy has been stored.

E, represents wind motors, which, for the purposes of the present invention, may be of any suitable or well known character whatever, and one or more of these are movably connected to the machine C, through suitable belting, gearing, or other transmitting mechanism. Two wind motor wheels E, in the illustration, are applied to the extremities of a shaft $a$, extending the length of the vessel, and the said shaft is belted by pulleys to the armature shaft or other rotary part of the machine C. The belt 3, may be thrown off to disconnect the wind motor from the machine C.

The armature shaft or rotary part of the machine C, is connected to the propeller shaft $c$, in the illustration, by means of a clutch $d$, permitting the mechanical connection between such machine C, and the propeller B, to be also controllable.

For convenience, the wind motor wheels are detachable from the shaft $a$, and may be folded as in Fig. 4, to be stored in any convenient part of the vessel A, when out of use.

In the operation, it is more especially intended that the motor wheels E, shall be affixed to the shaft $a$, when the vessel is at its moorings; the machine C, being disconnected from the propeller B, and connected to the wind motor E, E. The electrical connection between the accumulators D, and the machine C, being then so made that the direction of rotation imparted to the armature shaft of the said machine C, operating as a dynamo, shall charge the storage batteries, the natural force of the wind is utilized to produce and store electrical energy.

At any time when it is desired to propel the boat, the wind motor wheels E, E, may be unshipped, and stored away, the power required being at once available, by the disconnection of the electrical machine C, from the shaft $a$, and its connection to the propeller B; electrical connections being established accordingly in the manner stated, to operate the machine C, as a motor by the discharge of the electrical force which has been stored.

In the construction in which the motor wheels E, are upon a shaft journaled in fixed bearings, the said wheels are caused to face the wind by the natural position assumed by the vessel at anchorage as indicated in Fig. 3. For vessels intended for waters where the tide influences are stronger than the wind, a swiveled windmill of any well known pattern such as commonly in use may be used.

Separate electrical machines may be used;

one, a dynamo, actuated by the wind motor to charge the storage batteries; the other, a motor, actuating the propeller by the energy discharged. Thus the batteries may be charged in one circuit and discharged in another simultaneously, and the energy stored independently of the rate of its expenditure while the boat is in motion. When more power is stored than consumed, the batteries or any portion of their number may be transferred, or the electrical energy discharged therefrom to charge the batteries of another electrically propelled boat.

The self-maintaining portable establishment constituted by the herein-described combination of devices may be readily removed from place to place, possessing the advantage that it is self-contained and complete, requiring no supply of fuel, and may be used as a charging tender for supplying other vessels available at different places of consumption.

Having thus fully described my invention, what I claim, and desire to secure by Letters Patent, is—

1. The combination of a boat, a wind motor, on said boat an electrical storage battery, on said boat a propeller, and an electrical dynamo-motor machine on said boat adapted for electrical connection to the storage battery as described, and means for mechanically connecting the said electrical machine to the wind motor, or to the propeller, for the purposes set forth.

2. The combination of a boat, a propeller, a storage battery on the boat, a dynamo-motor machine on the boat, a wind motor for operating the dynamo-motor to charge the battery, and a shaft between said dynamo-motor and propeller having a clutch mechanism, substantially as specified.

FREDERICK G. CORNING.

Witnesses:
E. MacEntee,
Wm. C. Behrens.